United States Patent [19]

Kuwashima

[11] Patent Number: 5,091,969
[45] Date of Patent: Feb. 25, 1992

[54] PRIORITY ORDER OF WINDOWS IN IMAGE PROCESSING

[75] Inventor: Shigesumi Kuwashima, Tokyo, Japan

[73] Assignee: Kabushiki Kaisha Ouyo Keisoku Kenkyusho, Tokyo, Japan

[21] Appl. No.: 652,389

[22] Filed: Feb. 6, 1991

Related U.S. Application Data

[63] Continuation of Ser. No. 218,441, Jul. 12, 1988, abandoned, which is a continuation of Ser: No. 919,215, Oct. 15, 1986, abandoned.

[30] Foreign Application Priority Data

Dec. 9, 1985 [JP] Japan .................................. 60-275024

[51] Int. Cl.$^5$ ............................................. G06K 9/20
[52] U.S. Cl. ......................................... 382/48; 382/30; 382/54; 340/723
[58] Field of Search ................... 382/22, 25, 27, 28, 382/30, 32, 33, 34, 41, 48, 49, 54; 358/105, 282, 284; 340/721, 723, 724

[56] References Cited

U.S. PATENT DOCUMENTS

| | | | |
|---|---|---|---|
| 3,614,736 | 10/1971 | McLaughlin | 382/30 |
| 4,327,354 | 4/1982 | Persoon | 382/22 |
| 4,398,256 | 8/1983 | Nussmeier | 382/54 |
| 4,499,597 | 2/1985 | Alves | 382/27 |
| 4,542,376 | 9/1985 | Bass et al. | 340/723 |
| 4,550,432 | 10/1985 | Andersson | 382/27 |
| 4,590,607 | 5/1986 | Kauth | 358/105 |
| 4,642,790 | 2/1987 | Minshull et al. | 340/723 |
| 4,739,400 | 4/1988 | Veitch | 358/105 |
| 4,780,710 | 10/1988 | Tasumi | 340/723 |
| 4,783,833 | 11/1988 | Kawabata et al. | 382/22 |

*Primary Examiner*—David K. Moore
*Assistant Examiner*—Jose L. Couso
*Attorney, Agent, or Firm*—Wenderoth, Lind & Ponack

[57] ABSTRACT

The concept of windows has been widely used in the technical field of image processing. Since the conventional method was necessary to define the shape of the windows so that one window does not include more than one subject, the algorithm of image processing including determination of the windows became inevitably complicated to require complex hardware. Further, the prior method was difficult to process the images at high speed. According to the present invention, there is provided an image processing method which enables efficient processing by giving priority order to windows and processing images in accordance with the predetermined priority order.

5 Claims, 5 Drawing Sheets

FIG. IA
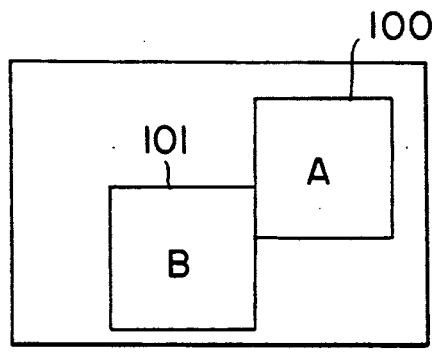
FIG. IB
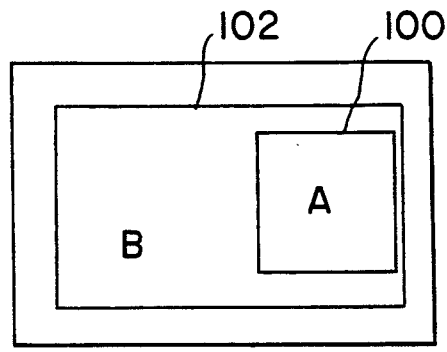
FIG. 2
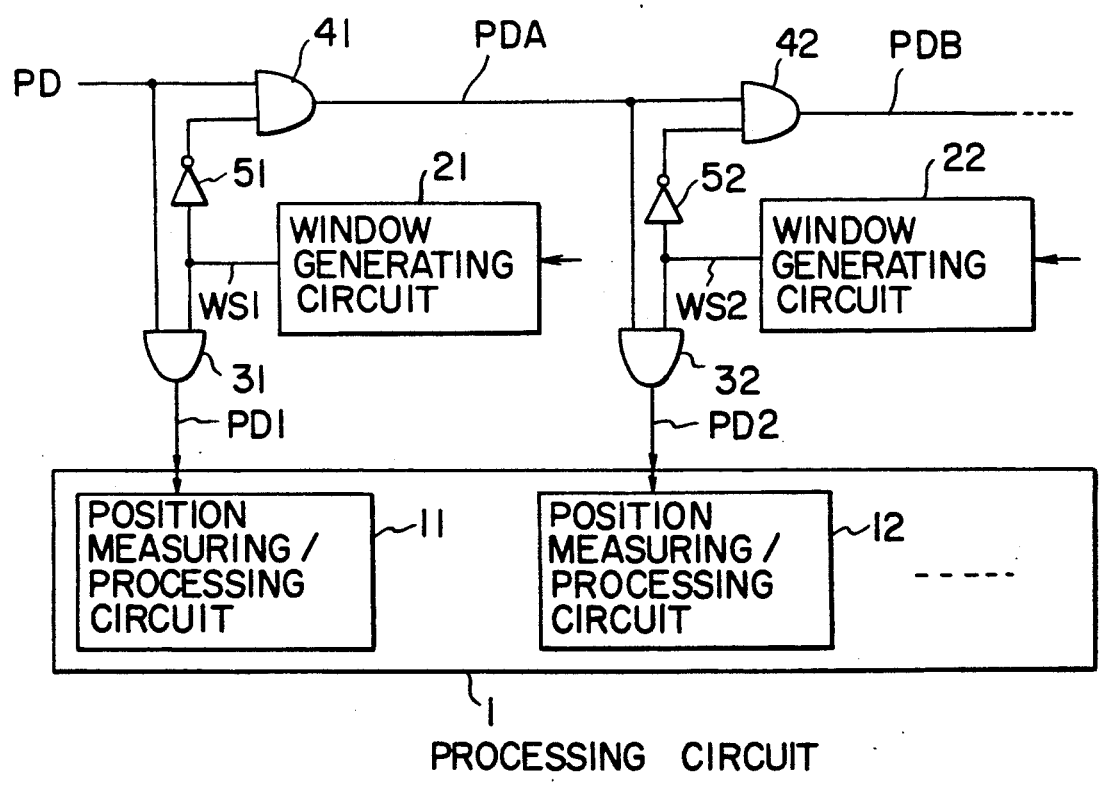

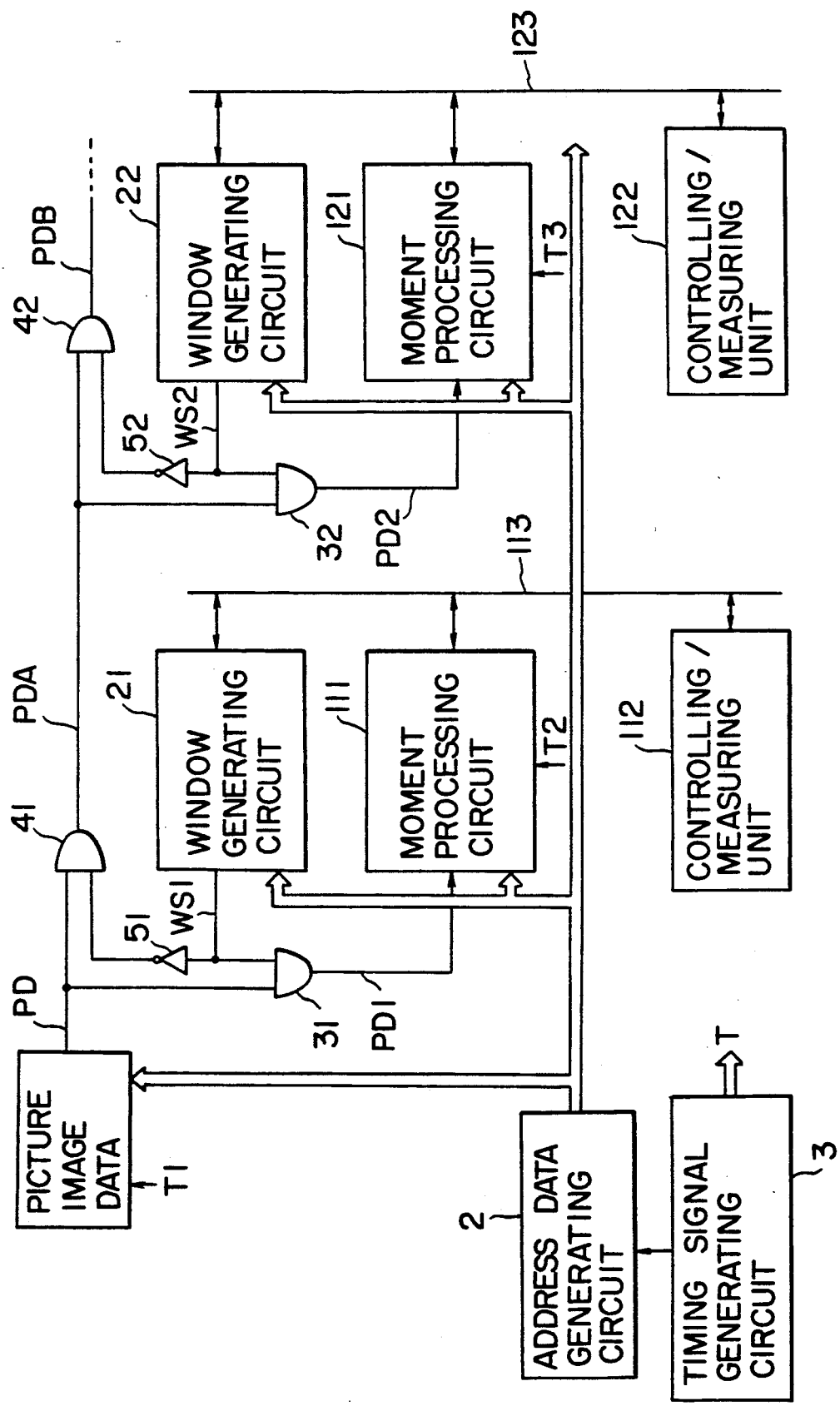

PRIORITY ORDER OF WINDOWS IN IMAGE PROCESSING

This application is a continuation of now abandoned application Ser. No. 07/218,441 filed on July 12, 1988, which was a continuation of now abandoned application Ser. No. 07/919,215, filed Oct. 15, 1986.

BACKGROUND OF THE INVENTION

The present invention relates to an image processing method which processes images according to priority order of windows on image information.

When there are two or more objects in the same frame of when there exists an unnecessary interfering image (hereinafter also referred to as "subjects") even if there is only one main subject, the concept of windows has been widely used in the technical field of image processing. For example, as shown in FIG. 1A, windows 100 and 101 are defined to correspond to subjects A and B respectively in a manner not to include more than one subject therein. However, according to the prior art method, since it was necessary to define the shape of the windows so that one window does not include more than one subject, an algorithm of the image processing including determination of the windows inevitably become complicated so as to require complex hardware. It was difficult to process the images at high speed by this conventional processing method.

SUMMARY OF THE INVENTION

The present invention was contrived under the above circumstances, and an object of the present invention is to provide an image processing method which enables efficient processing by giving priority order to the windows and processing images according to such priority order.

According to one aspect of the present invention, for achieving the object described above, there is provided an image processing method which is characterized in that when measuring a characteristic amount of a data group having an array of n-dimension (wherein n is an integer and n≧1) using a window comprising a data group of a structure expressing a subset, said windows are given priority order for processing.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A and 1B are views which show the prior art method and the present invention method in comparison;

FIG. 2 is a block diagram which shows one example of a circuit which materializes the present invention method;

FIG. 3 is a block diagram which shows a detail circuit in FIG. 2;

DESCRIPTION OF THE PREFERRED EMBODIMENT

Figure 4D:
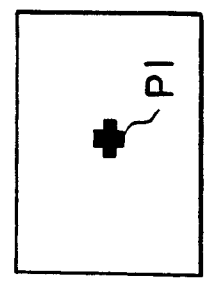
FIGS. 4A to 4G and FIGS. 5A to 5F are views which explain the operation thereof, respectively.

According to the present invention, for example, when two subjects A and B are processed as shown in FIG. 1B, subset windows 100 and 102 which respectively correspond to A and B are set and a higher priority order is given to the window 100 than to that of the window 102. This enables processing similar to the prior art even when the two subjects A and B are simultaneously contained in the window 102. In other words, the present invention relaxes restriction on the shape of the window of the lower priority order, simplifies a circuit system and simply realizes a faster image processing by giving priority order to the windows.

FIG. 2 shows a circuit system which realizes the present invention method wherein window signals WS1, WS2, ... outputted from window generating circuits 21, 22, ... are inputted to AND circuits 31, 32, ... respectively as well as to AND circuits 41, 42, ... via inverters (NOT circuits) 51, 52, ... Picture image data PD is inputted to the AND circuits 31 and 41 while the outputs of the AND circuits 41, 42, ... are sequentially inputted to the AND circuit 42, ... which have lower priority order. The outputs of the AND circuits 31, 32, ... are inputted to position measuring processing circuits 11, 12, ... inside a prosessing circuit 1. Thus, picture image data PD1, PD2, ... in the set windows are outputted from the AND circuits 31, 32, ... according to the priority order, and are independently inputted to and processed by the position measuring processing circuits 11, 12, .... A signal PDA which has been screened by the window signal WS1 is outputted from the AND circuit 41 and is inputted to the AND circuits 32 and 42 while the signal PDB which has been screened by the window signal WS2 is further outputted from the AND circuit 42. In the similar manner, the signals are inputted to downstream AND circuits consecutively in the order. It therefore means that the screened portion on the picture image consecutively increases as the circuit proceeds from the AND circuits 41, 42, ... and thereafter.

An example of processing of binary data on picture images in time series will be explained by referring to an automatic tracking system.

FIG. 3 shows a portion of the control circuit of the automatic tracking system in correspondence with FIG. 2. Picture image data PD as shown in FIG. 4A is inputted to the AND circuits 31 and 41. A timing signal generating circuit 3 which outputs timing signals T required for plotting a two-dimensional coordinate system feeds timing signals T1, T2, T3, ... to moment processing circuits 111, 121, ... as well as to the picture image data PD. An address data generating circuit 2 comprises a counter which counts signals from the timing signal generating circuit 3 to plot an X-Y coordinate system. The address data which generated at the generating circuit 2 is fed to the picture image data PD as well as to the window generating circuits 21, 22, ... and the moment processing circuits 111, 121, .... The window generating circuits 21, the moment processing circuit 111 and the controlling/measuring unit 112 are connected to one another by a bus line 113 while the window generating circuit 22, the moment processing circuit 121 and controlling/measuring unit 122 are connected to one another by a bus line 123. The window generating circuits 21 and 22 generate a binary pattern of "1", "0" for the coordinate of the address data outputted from the address data generating circuit 2. The moment processing circuits 111 and 121 respectively comprise a counter of 0-dimension moment and a cumulative circuit of the primary moment. The controlling-/measuring units 112 and 122 respectively comprise a microprocessor, etc. and controls the window parameters mainly comprising variables of the medium (such as the position of the center of gravity or the centroid of a two-dimensional figure) of the primary moments obtained in primary moment/0-dimension moment.

Figure 4C:
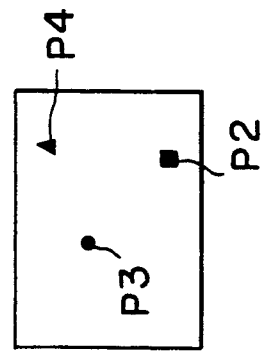
Figure 4B:
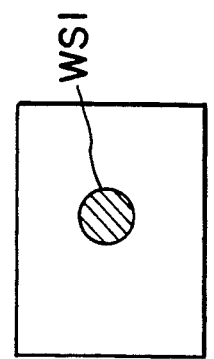
Figure 4A:
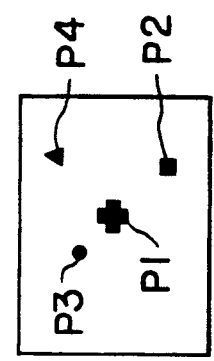
Figure 4G:
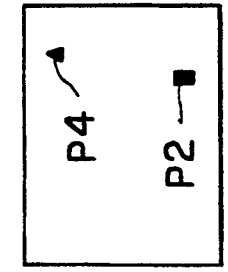
Figure 4F:
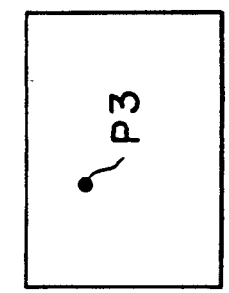
Figure 4E:
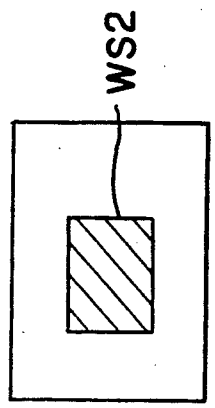

In such a construction, when the window signal WS1 as shown in FIG. 4B is outputted from the window generating circuit 21, the output PDA of the AND circuit 41 becomes as shown in FIG. 4C and the output PD1 of the AND circuit 31 becomes as shown in FIG. 4D. The signal PD1 of the subject processed by the window signal WS1 is inputted to the moment processing circuit 111. When a window signal WS2 as shown in FIG. 4E is outputted from the window generating circuit 22, the output PD2 of the AND circuit 32 becomes as shown in FIG. 4F, and the output PDB of the AND circuit 42 becomes as shown in FIG. 4G. Thus, the signal PD2 of the subject processed by the window signal WS2 is inputted to the moment processing circuit 121 and the moments are independently computed with the collaboration of the controlling/measuring units 112 and 122.

Now the explanation is given referring to a specific example.

Figure 5C:
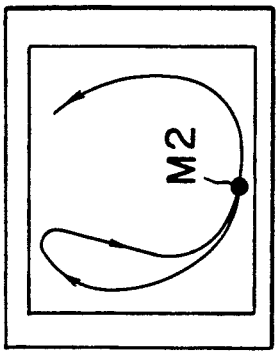
Figure 5F:
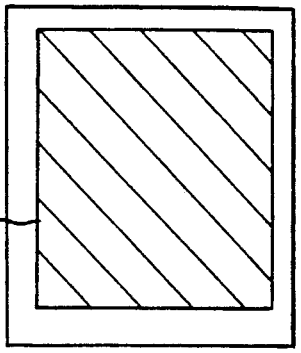
Figure 5B:
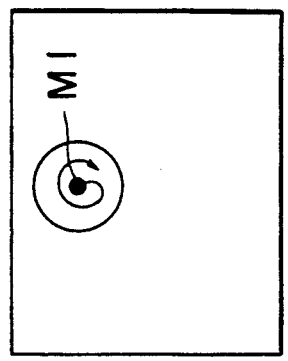
Figure 5E:
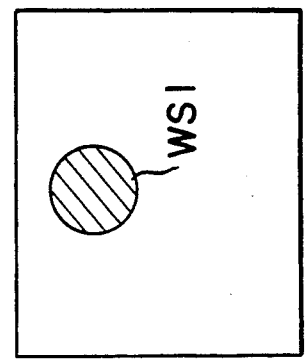
Figure 5A:
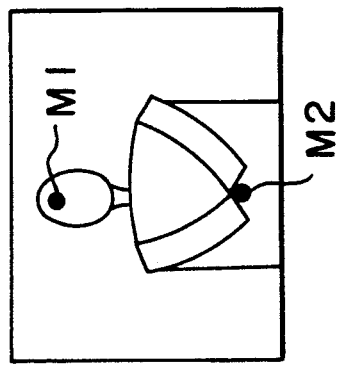
Figure 5D:
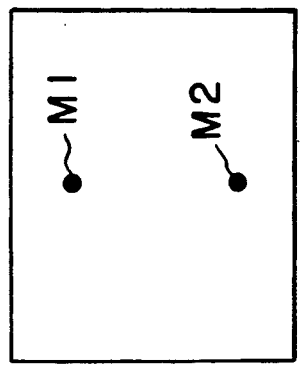

It is assumed that marks M1 and M2 are attached to a head and a wrist of a golf player as shown in FIG. 5A in order to analyze a golf swing by using a TV camera. Output signals from the TV camera becomes the picture image data PD described above. These marks M1 and M2 are made brighter than the background and expressed in data "1" by setting a threshold value appropriately to obtain binary images as shown in FIG. 5D. These binary image signals are inputted to the AND circuits 31 and 41 as the picture image data PD; the timing signal T is generated due to a synchronizing signal of the picture image signal PD; and X-Y coordinate data is generated in the address data generating circuit 2. The window signal WS1 as shown in FIG. 5E is generated in the window generator 21 to track the mark M1 of the head alone as shown in FIG. 5B. The window signal WS2 as shown in FIG. 5F is generated in the window generating circuit 22 to track the mark M2 the wrists as shown in FIG. 5C alone. By computing the moments at the marks M1 and M2 respectively under these conditions, the wrist and the head can be computed simultaneously. By conducting the above procedure consecutively on the successive picture image signals, the movements of the wrist and the head may be computed consecutively and continuously. If the computing system is so controlled as to track the movements of the wrist and the head continuously and if they do not overlap chronologically, the locus of the head and that of the wrist may be computed without overlapping with each other since the windows are set separately.

Figure 6:
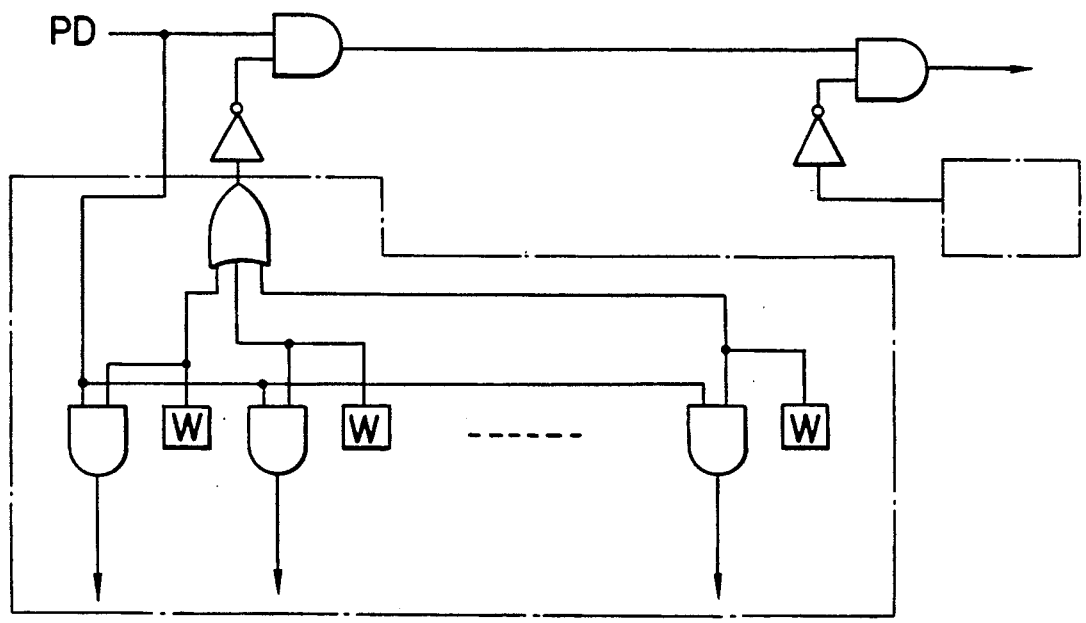
FIGS. 6 and 7 are circuits which show other embodiments to realize the present invention method, respectively.
Figure 7:
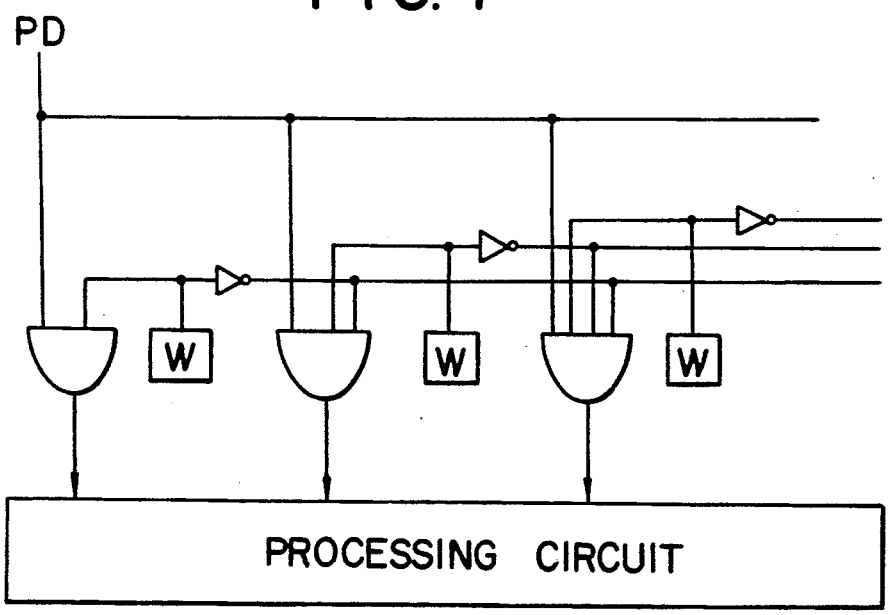

FIG. 6 shows an embodiment of a circuit when plural number of windows with same priority level are provided. FIG. 7 shows another embodiment of the priority order circuit of FIG. 2. Although the window used to set the priority order and the window for processing completely correspond with each other in the above mentioned examples, they do not necessarily have to be identical figures.

As explained above, the present invention method facilitates defining of the window shapes since it provides priority order to the window and makes the algorithm of image processing simpler.

It should be understood that many modifications and adaptations of the invention will become apparent to those skilled in the art and it is intended to encompass such obvious modifications and changes in the scope of the claims appended hereto.

What is claimed is:

1. An image processing method comprising the steps of: preparing a plurality of independent windows which respectively comprises a structure expressing a subset of a whole image, with the image being a group which has an array structure of n-dimensions where n is an integer and $n \geq 1$, and a size or shape of at least one of said independent windows could be set at will and mutual relationships among said independent windows could be freely located in the whole image to be measured;

allotting a priority order to said respective independent windows for simultaneous processing;

preparing a plurality of measuring processing means to respectively process image data which are expressed by said independent windows; and respectively measuring, in each of the plurality of measuring processing means, a characteristic amount of an image within said respective independent windows, wherein at least one of said plurality of measuring processing means, corresponding to said independent window having a highest priority allotted to it in an overlapped area where said independent windows overlap, is selected to process the image of the overlapped area and another one of said plurality of measuring processing means is inhibited from processing the image of the overlapped area.

2. An image processing method as claimed in claim 1, wherein each of said measured characteristic amounts is an amount which is unilaterally determined in accordance with features of its respective image.

3. An image processing method as claimed in claim 1, further including the step of computing m-dimensional moments corresponding to said respective independent windows, wherein m is an integer and $m \geq 0$.

4. An image processing method as claimed in claim 1, wherein said step of computing said m-dimensional moments assumes that moving images are processed.

5. An image processing method as claimed in claim 4, wherein said step of computing is conducted by successively and sequentially processing adjacent images which are closely correlated.

* * * * *